USOO5464267A

United States Patent [19]
Racine et al.

[11] Patent Number: 5,464,267
[45] Date of Patent: Nov. 7, 1995

[54] STABLE LIFT MECHANISM FOR SPOILER SUN ROOF PANEL

[75] Inventors: Lloyd G. Racine, Shelby Township; James F. Feldpausch, St. Clair Shores; Ronald M. Fantin, Rochester, all of Mich.

[73] Assignee: Webasto Sunroofs, Inc., Rochester Hills, Mich.

[21] Appl. No.: 229,752

[22] Filed: Apr. 18, 1994

[51] Int. Cl.$^6$ ..................................................... B60J 7/047
[52] U.S. Cl. ......................... 296/216; 296/220; 296/223; 296/224
[58] Field of Search .................................... 296/216, 220, 296/223, 224

[56] References Cited

U.S. PATENT DOCUMENTS

| | | | |
|---|---|---|---|
| 4,746,165 | 5/1988 | Fuerst et al. | 296/216 |
| 4,877,285 | 10/1989 | Huyer | 296/216 |
| 5,288,125 | 2/1994 | Huyer | 296/216 |

FOREIGN PATENT DOCUMENTS 577097  1/1994  European Pat. Off. ............... 296/224

Primary Examiner—Dennis H. Pedder
Attorney, Agent, or Firm—Cushman Darby & Cushman

[57] ABSTRACT

A sun roof assembly for an opening in a vehicle roof in which a sun roof panel mounted on a pair of mounting arms is moved between closed and vented positions by an improved stable lifting mechanism which includes two pairs of cooperating lift members each a sliding member mounted in stable sliding relation on an associated track for rearward and forward movements with respect thereto between closed, vented and open positions and a pivoting member pivotally connected to an intermediate portion of the associated mounting arm. Each cooperating pair of lift members have spaced first and second sliding connections therebetween constructed and arranged so that when the sliding member is moved between the closed and vented positions thereof the associated pivoting member is stably moved to pivot the associated mounting arm about the pivotal axis of the associated forward slide member between the closed and vented positions of the associated mounting arm.

22 Claims, 4 Drawing Sheets

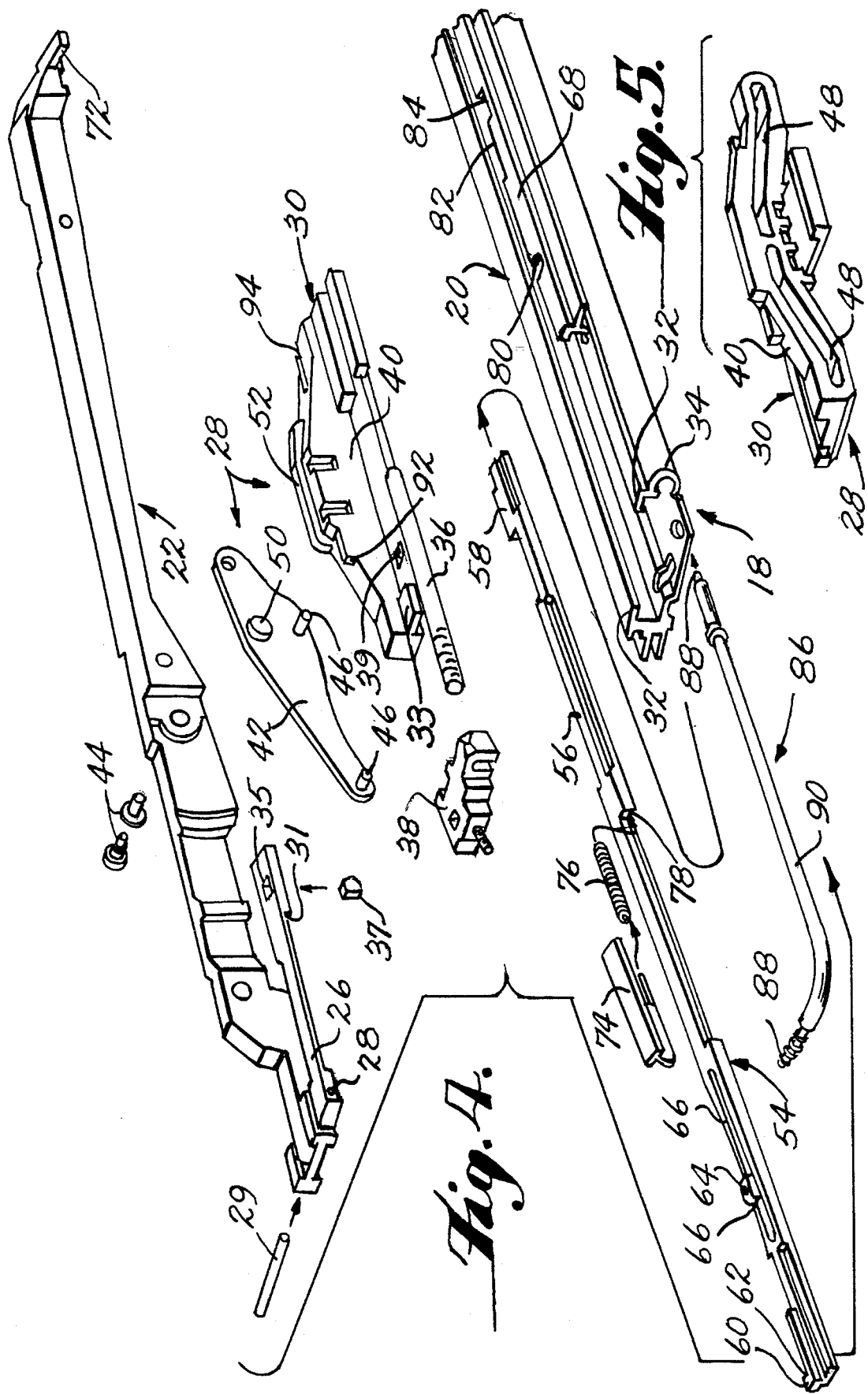

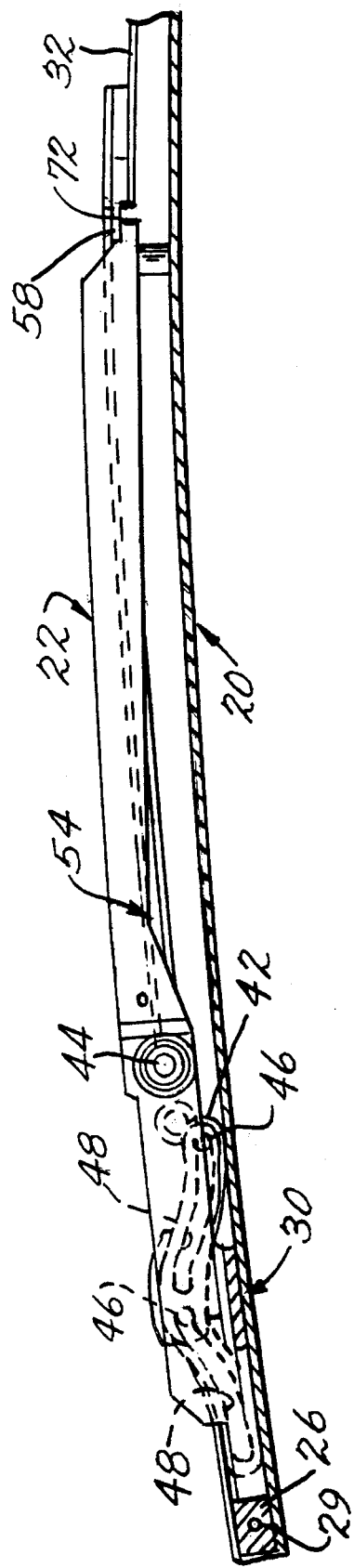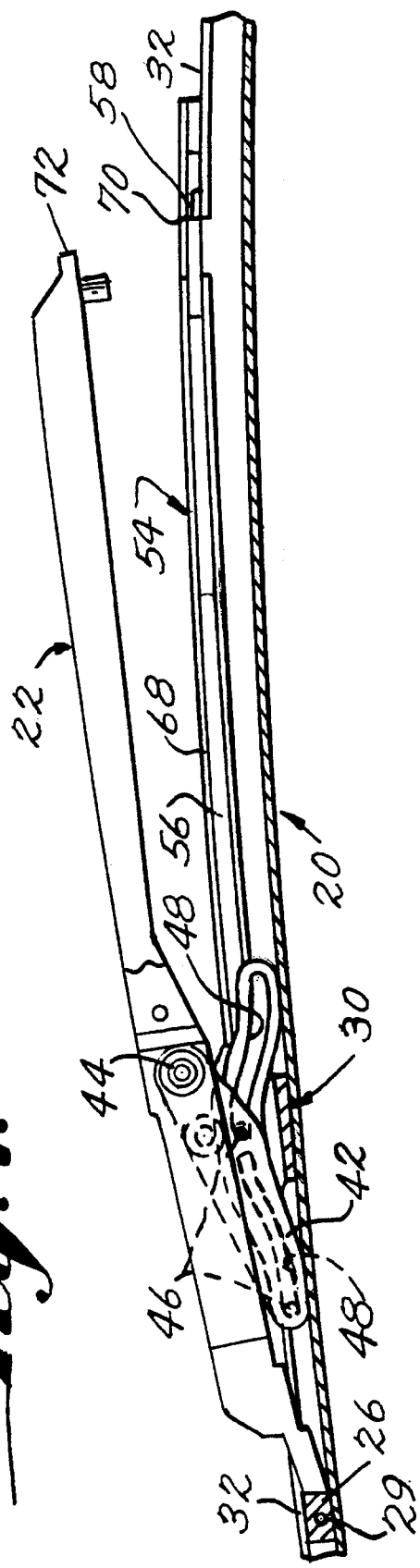

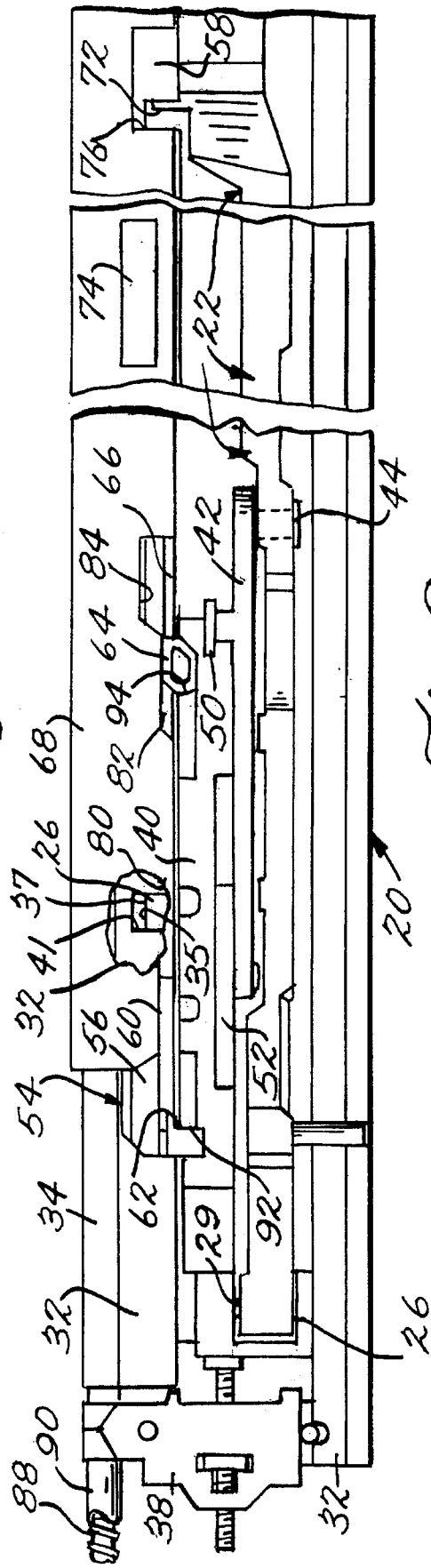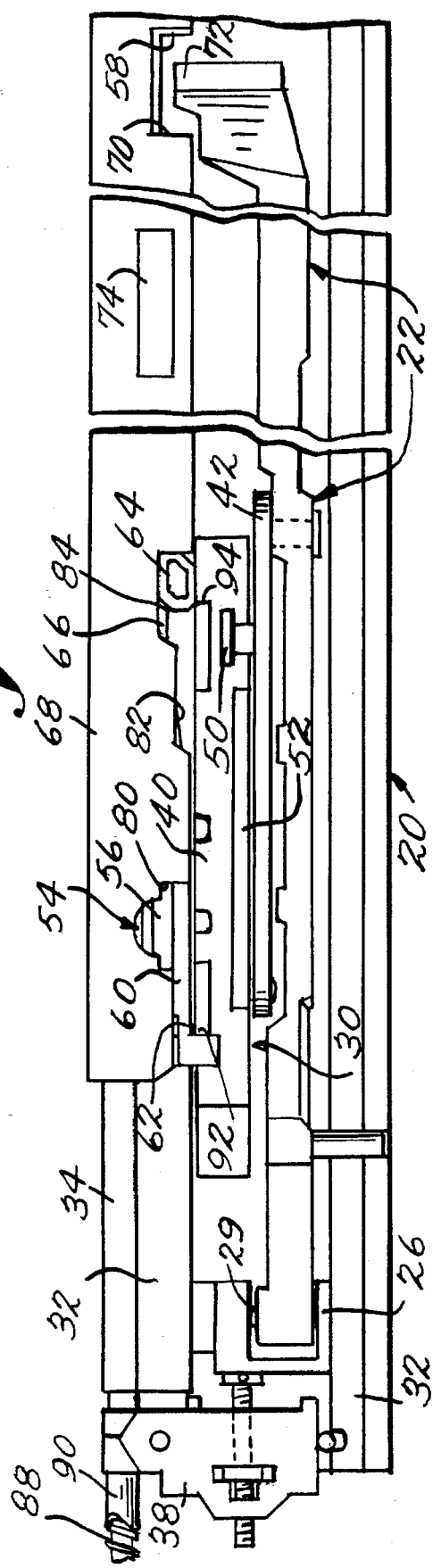

STABLE LIFT MECHANISM FOR SPOILER SUN ROOF PANEL

This invention relates to sun roof assemblies for vehicles and more particularly to sun roof assemblies of the spoiler type.

Spoiler type sun roof assemblies are known and are to be contrasted with sun roof assemblies of the pocket type. In a pocket type sun roof, the sun roof panel sub-assembly is moved from a closed position with respect to the roof opening into either a vent portion wherein the rearward end of the sun roof panel sub-assembly is tilted upwardly or an open position wherein the sun roof panel sub-assembly is moved downwardly and then rearwardly into a pocket below the exterior of the portion of the roof rearwardly of the opening. In contrast, in a spoiler sun roof assembly, the sun roof panel sub-assembly is moved from a closed position with respect to the roof opening sequentially into a vent position wherein the rearward end of the sun roof panel sub-assembly is tilted upwardly and then rearwardly into an open position wherein a substantial rearward portion of the sun roof panel sub-assembly is held in cantilever fashion above the exterior of the portion of the roof rearwardly of the opening.

The necessity to support a substantial rearward portion of the sun roof sub-assembly in cantilever fashion in its open position presents a particularly acute problem in stably supporting the sun roof panel sub-assembly throughout its movement. There are essentially two basic systems that can be utilized to accomplish the sequential movements. In the first system, the moving mechanism is made to initially act on the sun roof panel sub-assembly at both the front end and rear end thereof until it reaches the vent position and thereafter the position that the mechanism acts on the rear end of the sun roof panel sub-assembly is effectively shifted forwardly relative to the sun roof sub-assembly until the sun roof sub-assembly reaches the full open position. With this system, the movement between the closed and vent positions can be easily stabilized but the movement between the vent and full open positions becomes complicated and difficult to stabilize. In the other system, the moving mechanism acts initially on a forward end and an intermediate portion of the sun roof panel sub-assembly during the movements between the closed and vent positions and thereafter the positions that the moving mechanisms acts on the sun roof sub-assembly does not change as the movements between the vented and full open positions take place. This latter system is more prevalent because of the simplicity with which the movements between vented and full open positions can be accomplished. However, a difficult problem of stability is presented in the movements between the closed and vented positions. There exists a need to provide more stability in the movement of a spoiler type sun roof panel.

An object of the present invention is to fulfill the need expressed above. In accordance with the principles of the present invention, this objective is accomplished by providing a sun roof assembly for an opening in a vehicle roof which includes a stationary frame assembly adapted to be mounted on the vehicle roof below the opening therein including an elongated fore and aft extending track on each side of the opening. A mounting arm is associated with each track and a sun roof panel of a size to close the opening is fixedly mounted on the mounting arms. A forward slide member is slidably mounted in each track for sliding movement between a forward closed or vented position and a rearward open position thereon. Each of the mounting arms has a forward end thereof connected to the associated forward slide member for pivotal movement with respect thereto about a transverse horizontal axis between closed and vented positions when the associated forward slide member is in the closed or vented position thereof and for movement with the associated forward slide member between the closed or vented and open positions thereof when the associated mounting arm is in the vented position thereof with respect to the associated forward slide member so that the sun roof panel mounted on the mounting arms is disposed (1) in closing relation with the opening when the mounting arms are in the closed position thereof, (2) in inclined venting relation with the opening when the arms are in the vented position thereof and the forward slide members are in the forward position thereof, and (3) in an opening relation with respect to the opening when the mounting arms are in the vented position thereof and the forward slide members are in the rearward position thereof. A pair of cooperating lift members are associated with each track rearwardly of the forward slide member. Each pair of cooperating lift members includes a sliding member mounted in stable sliding relation on the associated track for rearward and forward movements with respect thereto between closed, vented and open positions and a pivoting member pivotally connected to an intermediate portion of the associated mounting arm. Each cooperating pair of lift members has spaced first and second sliding connection therebetween constructed and arranged so that when the sliding member is moved between the closed and vented positions thereof the associated pivoting member is stably moved to pivot the associated mounting arm about the pivotal axis of the associated forward slide member between the closed and vented positions of the associated mounting arm. A locking member is associated with each track mounted for movement between a locking position disposed in locking relation with a rearward portion of the associated mounting arm in the closed position thereof and a releasing position enabling the associated mounting arm to be moved out of the closed position thereof. A moving mechanism is provided movable in opposite directions between locking and open positions. The forward slide members, the sliding members and the locking members are constructed and arranged with respect to the moving mechanism so that (1) the locking members are moved between the locking and releasing positions thereof when the moving mechanism is moved between the locking position and an intermediate releasing position, (2) the sliding members are moved between the closed and vented positions thereof when the moving mechanism is moved between an intermediate closed position and an intermediate vented position to cause the pivoting members to pivot the mounting arms between the closed and vented positions thereof, and (3) the sliding members and forward slide members with the mounting arms in the vented position thereof are moved together between the vented and open positions thereof when the moving mechanism is moved between the intermediate vented position thereof and the open position thereof.

Another problem which is peculiar to spoiler type sun roof assemblies such as herein contemplated is created because of the necessity to lock the rear end portion of the sun roof assembly into its closed position. An advantage of a spoiler type sun roof assembly is that there does not have to be the same rearward extent of the stationary frame assembly which is disposed rearwardly of the opening as would be the case where a receiving pocket must be provided. Since the locking member must extend to the rear of the sun roof assembly when in its closed position, it is not possible to provide for a full movement of the locking member. Otherwise, the space advantages cannot be achieved. For this reason, the provision of a suitable locking arrangement provides some difficulty and there is a need to provide for a simpler locking arrangement for spoiler type sun roof assemblies.

Accordingly, another object of the present invention is to fulfill the need described immediately thereabove. In accordance with the principles of the present invention, this objective is obtained by providing a sun roof assembly for an opening in a vehicle roof which comprises a stationary frame assembly adapted to be mounted on the vehicle roof below the opening therein including an elongated fore and aft extending track on each side of the opening, a mounting arm associated with each track, a sun roof panel of a size to close the opening fixedly mounted on the mounting arms, a mounting mechanism associated with each track operatively connected with the associated mounting arm, each of the mounting mechanisms including a sliding member mounted in stable sliding relation on the associated track for rearward and forward movements with respect thereto between closed, vented and open positions, a locking member associated with each track mounted for movement between a locking position disposed in locking relation with a rearward portion of the associated mounting arm in the closed position thereof and a releasing position enabling the associated mounting arm to be moved out of the closed position thereof, a moving mechanism movable in opposite directions between locking and open positions. The forward slide members, the sliding members and the locking members are constructed and arranged with respect to the moving mechanism so that (1) the locking members are moved between the locking and releasing positions thereof when the moving mechanism is moved between the locking position and an intermediate releasing position, (2) the sliding members are moved between the closed and vented positions thereof when the moving mechanism is moved between an intermediate closed position and an intermediate vented position to pivot the mounting arms between the closed and vented positions thereof, and (3) the sliding members with the mounting arms in the vented position thereof are moved between the vented and open positions thereof when the moving mechanism is moved between the intermediate vented position thereof and the open position thereof. Each of the locking members are elongated and slidably mounted in the associated track for fore and aft movement between the locking and releasing positions. Each elongated locking member includes a rearward locking portion movable within an opening in the associated track when the locking member is in the locking position thereof. Each mounting arm has a laterally extending locking tab movable through the associated track opening when the mounting arm is moved from or into the closed position thereof. The locking portion of each locking member is constructed and arranged with respect to the associated track opening and locking tab to block the associated opening and interengage the associated locking tab in locking relation when the associated locking member is in the locking position thereof and to unblock the associated opening when the associated locking member is in the releasing position thereof.

These and other objects of the present invention will become more apparent during the course of the following detailed description and appended claims.

The invention may best be understood with reference to the accompanying drawings wherein an illustrative embodiment is shown.

IN THE DRAWINGS

FIG. 4 is an exploded view showing one track and associated components of the sun roof assembly shown in FIGS. 1–3;

FIG. 5 is a perspective view showing the opposite side of the sliding member shown in FIG. 4;

FIG. 6 is a vertical sectional view showing the position of the components associated with one track when the sun roof panel assembly is in a locked closed position;

FIG. 7 is a view similar to FIG. 6 showing the position of the components when the sun roof panel assembly is in a vented position;

FIG. 8 is a top plan view of the components associated with one track in the position when the sun roof assembly is in its closed locked position, with certain parts broken away for purposes of clearer illustration; and FIG. 9 is a view similar to FIG. 8 without the breakaway showing the position of the components when the locking member has reached its releasing position.

Figure 1:
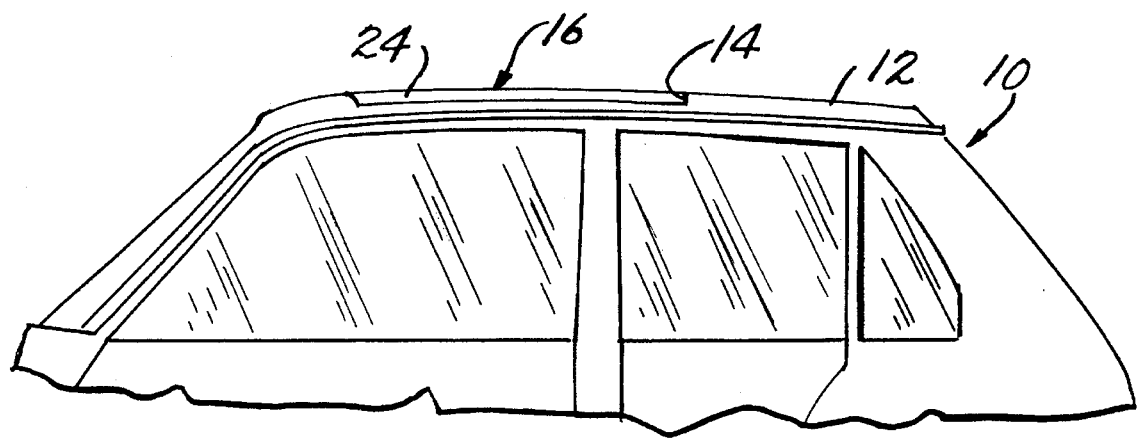
FIG. 1 is a fragmentary side elevational view of a motor vehicle having a sun roof assembly, embodying the principles of the present invention, mounted in the roof thereof, the sun roof assembly being shown in its closed position in closed relation to the opening in the roof.
Figure 2:
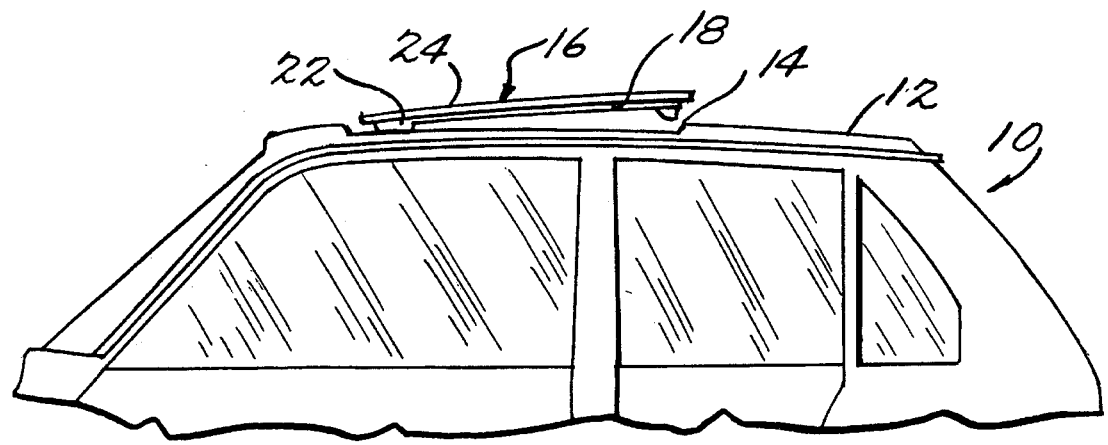
FIG. 2 is a view similar to FIG. 1 showing the sun roof assembly in a vented position in vented relation with the opening in the roof.
Figure 3:
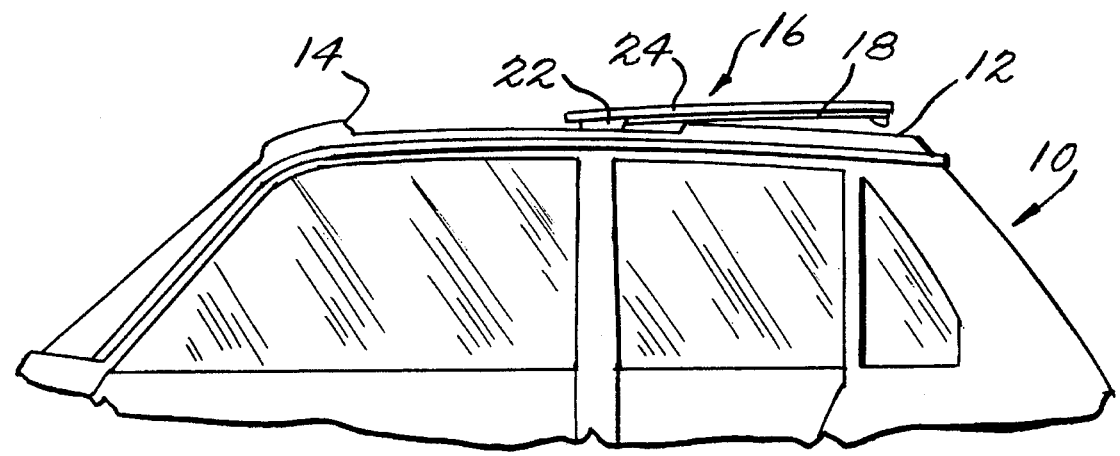
FIG. 3 is a view similar to FIG. 1 showing the sun roof assembly in an open position in open relation to the opening in the roof.

Referring now more particularly to the drawings, there is shown in FIGS. 1–3 a motor vehicle, generally indicated at 10, which includes a roof 12 having an opening 14 therein and a sun roof assembly, generally indicated at 16, embodying the principles of the present invention operatively mounted within the roof 12 so as to be moved from a closed position with respect to the opening 14, as shown in FIG. 1, into a vented position with respect to the opening 14, as shown in FIG. 2, and finally into an open position with respect to the opening 14, as shown in FIG. 3.

The sun roof assembly 16 includes the usual frame structure, generally indicated at 18, which is mounted on the roof 12 in a position below the opening 14 thereof. The frame structure 18 is of a conventional nature and includes a pair of elongated tracks, generally indicated at 20, extending on opposite sides of the opening 14, each of which is constructed in accordance with the principles of the present invention.

The sun roof assembly 16 includes a mounting arm, generally indicated at 22, operatively associated with each of the tracks 20. A sun roof panel 24 is fixedly mounted on the two mounting arms 22 so as to be moved thereby into closing relation, vented relation, and open relation, with respect to the vehicle roof opening 14, as shown in FIGS. 1–3.

Referring now more particularly to FIG. 4, each mounting arm 22 is connected to a mounting mechanism which includes a forward slide member 26 and a pair of cooperating lift members, generally indicated at 28. Each forward slide member 26 is slidably mounted in an associated track 20 for sliding movements between a forward closed or vented position and a rearward open position with respect to the associated track 20.

Each mounting arm 22 has a forward end thereof connected to the associated forward slide member 26, as by a pivot pin 29, for pivotal movement with respect thereto about a transverse horizontal axis between closed and vented positions when the associated forward slide member 26 is in the closed or vented position thereof and for movement with the associated forward slide member 26 between the vented and open positions thereof when the associated mounting arm 22 is in the vented position thereof.

Each pair of cooperating lift members 28 includes a sliding member, generally indicated at 30, mounted in stable sliding relation on the associated track 20 for rearward and forward movements with respect thereto between locking and open positions and intermediate closed and vented positions therebetween.

FIG. 4 illustrates a preferred cross-sectional configuration of each track 20 which is essentially a broad U with inwardly extending flanges on the upward free end of the legs of the U. The outer leg of each track 20 has an arcuate bulge 34 formed therein. The sliding relation of each sliding member 30 within the associated track 20 is such as to extend from one leg to the other beneath the flanges 32. On an outer side of each sliding member 30 is a fixed forwardly extending connecting rod 36 positioned to slide within the associated bulge 34.

As best shown in FIG. 4, each forward slide member 26 is elongated rearwardly at a side thereof disposed laterally outwardly of the associated mounting arm 22. Formed in the underside of the elongated side of each forward slide member 26 is a recess 31 defined by opposed abutment surfaces. Each sliding member 30 includes a forward upstanding block portion 33 disposed laterally inwardly of the associated connecting rod 36 which extends upwardly within the associated downwardly facing recess 31 of the associated forward slide member 26 when each sliding member 30 is mounted in cooperating relation with the associated forward slide member 26.

Each forward slide member 26 and associated sliding member 30 mounted in cooperating relation therewith is mounted between opposite legs of the associated track 20 and beneath the flanges 32 thereof with the block portions 33 within recesses 31 being beneath the outer flanges 32. With this mirror image configuration of the tracks 20, the cooperating sliding members 30 and forward slide members 26 must both be entered within the tracks 20 from one end thereof. As shown in FIG. 4, the forward end of each track 20 is closed by a closure member 38 fixed to the forward end of each track 20. Each sliding member 30 includes an upstanding portion 40 which is adapted to extend upwardly between the flanges 32 of the associated track 20.

The cooperating relationship between each forward slide member 26 and the associated sliding member 30 wherein the associated block portion 33 is within the associated recess 31 enables the forward slide members and associated sliding members 30 to have relative movements with respect to each other in the direction of extent of the tracks 20 which are limited by the engagement of the block portions 33 with the abutment surfaces defining the recesses 31. When the forward slide members 26 are moved forwardly within the tracks 20 into abutting engagement with the closure members 38, the forward slide members 26 are in the closed or vented position thereof. When the block portions 33 of the sliding members 30 are in their forwardmost position within the recesses 31, the sliding members are in the closed positions thereof. In this position, a rectangular opening 35 extending vertically through the rearward end of the elongated side of each forward slide member 26 has a shiftable element 37 mounted therein which extends upwardly from the associated opening 35 within a notch or recess 41 in the associated flange 32 having a rearward forwardly facing inclined surface. Each sliding member 30 has an element receiving rectangular recess 39 having an inclined rearward surface which faces forwardly. The shiftable element 37 has an inclined rearward upper surface for engaging the inclined lower rearward surface for engaging the inclined surface of the recess 39. The recess is disposed at a position to align with the opening 35 when the associated block portion 33 is disposed within a rearmost position within the associated recess 31. This position of the sliding members 30 corresponds to the intermediate vented position thereof when the associated forward slide members 26 are in the closed or vented position thereof.

Each pair of cooperating members 28 also includes a pivoting member 42 which is preferably in the form of a triangular plate. One corner of each triangular plate 42 is pivotally connected with the associated mounting arm 22 at an intermediate portion thereof as by a pivot pin assembly 44. Each pivoting plate member 42 extends alongside the upstanding portion 40 of the associated sliding member 30. Each pair of cooperating members 28 is interconnected by spaced first and second sliding connections. While the sliding connections may be provided in any suitable manner, as shown the first and second sliding connections include first and second pins 46 which are fixed to and extend transversely from the other two corners of each pivoting plate member in a direction toward the upper portion 40 of the associated sliding member 30. Each first and second sliding connection also includes first and second spaced pin receiving grooves 48 in the facing side of the upper portion 40 of the associated sliding member 30.

It can be seen that the first and second pins 46 on each pivoting plate members 42 are spaced from the pivotal connection 44 with the associated mounting arm 22 different distances. The spacing of the pins 46 and their slidable relationship within the grooves 48 provides for the stable movement of each pivoting member 42 during the sliding movement of the associated sliding member 30.

Preferably, each pivoting plate member 42 is provided with a headed guide element 50 which is adapted to engage a ridge 52 on the upper end of the associated sliding member 30 so as to provide additional stability laterally between each of the two cooperating members 28.

The first and second grooves 48 are shaped so that, when the associated mounting arm 22 is in the closed position thereof, the pins 46 will be in the rearward extremities of the first and second grooves respectively as can be seen in FIG. 5. As each sliding member 30 is moved rearwardly from its closed position, the grooves 48 are shaped to stably move the associated pivoting member 42 so that the associated mounting arms 22 will be pivoted upwardly from the closed position thereof into the vented position thereof. It will be noted that the grooves also provide a dwell extent at the forwards ends thereof as well. The arrangement thus provides for the movement of the mounting arms 22 between their closed and vented positions in a highly stable fashion.

In order to lock the mounting arms 22 in their closed positions, there is associated with each track 20 an elongated locking member, generally indicated at 54. Each locking member 54 is preferably molded of a suitable plastic material to provide an elongated body 56 having a locking portion or element 58 on its rear end, an L-shaped projection 60 on the forward end thereof which provides a rearwardly facing abutment surface 62 and an intermediate moving element 64 which is connected with the main body 56 by elongated flexible integral elements 66 enabling the moving element 64 to be shiftable laterally with respect to the main body 56 of the locking member 54.

It will be noted that each track 20 includes an additional track element 68 extending along the inner flange 32 thereof which is generally of L-shaped configuration. The associated elongated locking member 54 is slidably mounted for forward and rearward movements within the track element 68 between locking and releasing positions with respect thereto.

At a position adjacent the rear end of each mounting arm when the mounting arm is in its closed position there is formed an opening 70 in the associated track 20 which extends through the associated flange 32 and track element 68. The rear end of each mounting arm 22 is formed with a transversely extending locking tab 72 which is positioned to pass through the opening 70 when the mounting arm 22 is moved into or from the closed position thereof. An intermediate portion of the track element 68 has an opening formed in the upper surface thereof. A fitting 74 is mounted in the opening which is capable of receiving one end of a spring 76, the opposite end of which engages a forwardly facing surface 78 provided by a recess in the central portion of the associated locking member body 56. The arrangement is such that each locking member 54 is thereby biased to move in a direction toward and into its releasing position.

Each track element 68 has its forward free edge cut back and then widened into a recess providing a forwardly facing stop surface 80 for engagement by the rearwardly facing surface of the L-shaped projection 60 of the associated locking member 54. The recess providing the stop surface 80 is formed in each L-shaped projection 60 to enable the flange 32 therebelow to have the notch or recess formed therein which receives the associated shiftable element 37.

In order to accommodate the moving element 64 of each locking member, a pair of communicating recesses 82 and 84 are formed in the associated track element 68 in a position spaced rearwardly of the stop surface 80. As best shown in FIGS. 4, 8 and 9, the forward recess 82 is shallow so that when the moving element 64 is disposed therein it is held in a laterally outwardly shifted position for coupling with the associated sliding member 30. The rearward recess 84 is relatively wide so that when the moving element 64 is disposed therein it is retained in a laterally inwardly shifted position for coupling with the associated track and decoupling with the associated sliding member 30.

The sun roof assembly 16 also includes a moving mechanism, generally indicated at 86, which also is of conventional and known construction. The moving mechanism 86 includes either a power-operated drive or a manual handle drive. These drives are conventional and are not illustrated in the drawings. The drive turns an output member (not shown) which is in the form of a gear and meshing with the gear teeth are a pair of elongated flexible members 88 formed by cables having a coil on the exterior thereof which mesh with the teeth of the output gear. There is one elongated member 88 associated with each track 20 and each elongated member 88 is mounted within a guide tube 90 so as to extend transversely along the front portion of the stationary frame assembly 18 in meshing engagement with the output drive member. Each tube 90 is bent rearwardly and communicated with the front end of the associated track 20 in the area of the bulge 34 thereof. The elongated member 88 extends from the tube 90 and is fixed to the connecting rod 36 of the associated sliding member 30.

The end of each elongated flexible moving member 88 is moved between locking and open positions. Set forth below is a detailed description of the operation of the parts of the sun roof assembly 16 when the moving members 88 are moved from the locking position thereof to the open position thereof. When the moving members 88 are in their locking position, the forward slide members 26 are retained in the closed or vented position thereof by virtue of the engagement of shiftable elements 37 within the openings 35 thereof and the notches within the flanges 32 below the recesses defining stop surfaces 80. The sliding members 30 are in the locking position thereof with block portions 33 in a forwardmost position within recesses 31. Mounting arms 22 and locking members 54 are in their locking positions thereof.

When each flexible moving member 88 moves from the locking position thereof rearwardly into an intermediate releasing position, the sliding member 30 connected therewith will have a comparable rearward movement. During the movement from the locking position to the intermediate releasing position, the associated locking member 54 is moved rearwardly from the locking position thereof to the releasing position thereof. This movement is facilitated by the associated springs 76 which serve to resiliently bias the associated locking member rearwardly. It will be noted from FIG. 6 and 8, that when each locking member 54 is in its locking position, the locking portion 58 thereof is disposed in locking relation with the locking tab 72. In addition, the rearwardly facing surface 62 at the forward end thereof is resiliently urged into engagement with a forwardly facing surface 92 on the associated sliding member 30. At the same time, a rearwardly facing surface 94 of the associated sliding member 30 is disposed in engagement with the shiftable moving element 64 which is disposed in the forward shallow recess 82 in the associated track 20. Preferably, each surface 94 and the surface of the associated shiftable element 64 engaged thereby have a slight incline in an outward and rearward direction so that when interengaged and the associated sliding member 30 is moved rearward the associated shiftable element will be biased outward as it is moved rearwardly therewith. As each sliding member 30 moves rearwardly, the associated locking member 54 will be moved rearwardly therewith either by virtue of the spring bias or by the interengagement between the rearwardly facing surface 94 of the associated sliding member 30 with the shiftable element 64 or by both. The rearward movement of the sliding members 30 together with the locking members 54 will continue until the locking portions 58 of the locking members are moved out of engagement with the locking tabs 72 of the mounting arms 22. When this position is reached, the associated sliding members 30 have reached an intermediate closed position. It will be noted that the initial rearward portion of the first and second grooves 48 in the sliding members 30 are straight for a distance generally equal to the distance between the locking position and intermediate closed position of the slide members 30. In this way, this movement of the sliding members 30 can take place without any movement of the pivoting members 42 or mounting arms 22 taking place.

As the slide members 30 continue to move rearwardly beyond the intermediate closed position, the shape of the first and second grooves 48 will cause the pivoting members 42 to move by virtue of the pivots 44 thereof with the mounting arms in a direction to begin to move the rear end of the mounting arms 22 upwardly. At about this time, the shiftable elements 64 of the locking members 54 are moved into a position where they reach the rearward deeper recesses 84. The outward bias of the slightly inclined surfaces 94 moving the elements 64 and the mounting of the elements 64 by the elements cause the elements 64 to enter the deeper recesses 84 as the locking members 54 continue to move rearwardly with the sliding members 30. When the moving elements 64 reach the end of the recesses 84, the forward projection 60 of each locking member 54 also engages the stop surface 80 provided at the forward end of each track 20. When each locking member 54 has thus reached its releasing position as shown in FIG. 9, the associated sliding members 30 will likewise be in an intermediate releasing position.

Since the rearwardly facing surfaces 94 of the sliding members 30 are now no longer in engagement with the shiftable moving elements 64 of the locking members 54 and the locking members are biased by spring 76 to remain in their releasing position by virtue of the interengagement of the stop surfaces, the further movement of the sliding members beyond the releasing position thereof will not be accompanied by any further movement of the locking members 54. As the sliding members move rearwardly, the grooves 48 of the sliding members are moved in a rearwardly direction causing the pins 46 to move the pivoting members 42 to continue the raising or tilting movement of the mounting arms 22. It will be noted that during this movement, each guide element 50 is engaged with the associated ridge 52 so as to further stabilize the interengagement of each sliding member 30 with the associated pivoting member 42. This movement will continue until the pins 46 reach the forward ends of the grooves 48 at which point the sliding members 30 have reached the vented position thereof as shown in FIG. 2. In this position, the block portions 33 of the sliding members 30 have reached their rearwardmost position within recesses 31 and openings 39 have reached a position of alignment below the openings 35 containing the shiftable elements 37.

Thereafter, as the sliding members 30 are moved rearwardly from the vented position thereof toward the open position thereof, the shiftable elements 37 are allowed to cam downwardly out of the track recesses and into the aligned openings 39, by virtue of the inclined surfaces on the tracks 20 and upper rearward corners of the shiftable elements 37, which decouples the forward slide members 26 from the tracks and couples them with the sliding members 30. Thus, the sliding members 30, the pivoting members 42, the mounting arms 22, and the forward slide members 26 are all stably interconnected so as to move rearwardly together. This movement will continue until the sliding members 30 reach the full open position as shown in FIG. 3.

When the moving mechanism 86 is turned in the opposite direction to move the sliding members 30 forwardly from the full open position thereof into the locking position thereof, the movements described are undertaken in reverse. It will be noted that when the sliding members 30 reach the vented position thereof, the forward slide members 26 will have reached the closed or vented position thereof in engagement with closure members 38. As the sliding members 30 are moved forwardly beyond the vented position, shiftable elements 37 which are within the recess 39 of the slide members 30 and below the track recesses 41 will be cammed upwardly by virtue of the inclination of the rearward surfaces of the recesses 39 and lower rearward corners of the shiftable elements 37. This upward movement of the shiftable elements 37 decouples the now stationary forward slide members 26 from the sliding members 30 and couples them to the tracks 20.

It will also be noted that when the sliding members 30 reach the intermediate releasing position thereof, the forwardly facing surfaces 92 of the sliding members 30 will reach the rearwardly facing surfaces 62 of the locking members 54 held in the releasing position thereof so that further forward movement of the sliding members 30 will move the locking members forwardly away from the releasing position thereof toward the locking position thereof. During an initial portion of the forward movement of the locking members 54 with the sliding members 30, the shiftable elements 64 will be cammed laterally inwardly from the deeper recesses 84 into the shallower recesses 82 by virtue of the inclination of the forward surfaces defining the deeper recesses 84 and the inclination of the forward outer corner of the shiftable elements 64 engaged thereby. This lateral shifting movement of the shifting elements 64 brings the shiftable elements 64 into a position just behind the rearwardly facing surfaces 94 of the sliding member 30 as shown in FIG. 8.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A sun roof assembly for an opening in a vehicle roof comprising a stationary frame assembly adapted to be mounted on the vehicle roof below the opening therein including an elongated fore and aft extending track on each side of said opening, a mounting arm associated with each track, a sun roof panel of a size to close the opening fixedly mounted on said mounting arms, a forward slide member slidably mounted in each track for sliding movement between a forward closed or vented position and a rearward open position thereon, each of said mounting arms having a forward end thereof connected to the associated forward slide member for pivotal movement with respect thereto about a transverse horizontal axis between closed and vented positions when the associated forward slide member is in the forward position thereof and for movement with the associated forward slide member between the forward and rearward positions thereof when the associated mounting arm is in the vented position thereof with respect to the associated forward slide member so that the sun roof panel mounted on said mounting arms is disposed (1) in closing relation with said opening when said mounting arms are in the closed position thereof, (2) in inclined venting relation with the opening when said arms are in the vented position thereof and said forward slide members are in the forward position thereof, and (3) in an opening relation with respect to the opening when said mounting arms are in the vented position thereof and said forward slide members are in the rearward position thereof, a pair of cooperating lift members associated with each track rearwardly of the forward slide member, each pair of cooperating lift members including a sliding member mounted in stable sliding relation on the associated track for rearward and forward movements with respect thereto between closed, vented and open positions and a pivoting member pivotally connected to an intermediate portion of the associated mounting arm, each pair of cooperating lift members having spaced first and second sliding connections therebetween constructed and arranged so that when the sliding member is moved between the closed and vented positions thereof the associated pivoting member is stably moved to pivot the associated mounting arm about the pivotal axis of the associated forward slide member between the closed and vented positions of the associated mounting arm, a locking member associated with each track, said locking members being constructed and arranged to be moved between a locking position disposed in locking relation with a rearward portion of the associated mounting arm in the closed position thereof and a releasing position enabling the associated mounting arm to be moved out of the closed position thereof, a moving mechanism movable in opposite directions between locking and open positions, said forward slide members, said sliding members and said locking members being constructed and arranged with respect to said moving mechanism so that (1) said locking members are moved between the locking and releasing positions thereof when said moving mechanism is moved between said locking position and an intermediate releasing position, (2) said sliding members are moved between the closed and vented positions thereof when said moving mechanism is moved between an intermediate closed position and an intermediate vented position to cause the pivoting members to pivot the mounting arms between the closed and vented positions thereof, and (3) the sliding members and forward slide members with the mounting arms in the vented position thereof are moved together between the vented and open positions thereof when said moving mechanism is moved between the intermediate vented position thereof and the open position.

2. A sun roof assembly as defined in claim 1 wherein the intermediate closed position of said moving mechanism is spaced forwardly of the intermediate releasing position thereof.

3. A sun roof assembly as defined in claim 1 wherein said moving mechanism includes a tube guided elongated flexible moving element associated with each track, each of said elongated elements having an end fixed to the associated sliding member, each sliding member being mounted for sliding movement on the associated track for movement between a locking position and the closed position, each of said spaced first and second sliding connections being constructed and arranged to permit movement of the associated sliding member between said locking and closed positions without any movement of the associated pivoting member taking place.

4. A sun roof assembly as defined in claim 3 wherein each of said locking members is elongated and slidably mounted on the associated track for fore and aft movement between said locking and releasing positions.

5. A sun roof assembly as defined in claim 4 wherein each elongated locking member includes a rearward locking portion movable within an opening in the associated track when said locking member is in the locking position thereof, each mounting arm having a laterally extending locking tab movable through the associated track opening when the mounting arm is moved from or into the closed position thereof, the locking portion of each locking member being constructed and arranged with respect to the associated track opening and locking tab to block the associated opening and interengage the associated locking tab in locking relation when the associated locking member is in the locking position thereof and to unblock the associated opening when the associated locking member is in the releasing position thereof.

6. A sun roof assembly as defined in claim 5 wherein each of said locking members and the associated sliding member include one way abutting surfaces constructed and arranged to interengage during the forward movement of the associated sliding member when the associated locking member is in the releasing position thereof so as to move the associated locking member into the locking position thereof during the continued forward movement of the associated sliding member into the locking position thereof, each of said locking members also including a laterally shiftable moving element constructed and arranged with respect to the associated track and sliding member to be coupled with the associated sliding member during the rearward movement thereof from the locking position thereof until the associated locking member reaches the releasing position thereof and to be coupled to the associated track during the remaining rearward movement of the associated sliding member away from the locking position thereof.

7. A sun roof assembly as defined in claim 6 wherein said each of said locking members is molded of a plastic material to include an elongated body with the shiftable moving element thereof being molded integrally with said body and integrally connected thereto by flexible elongated portions enabling said moving element to be shiftable laterally with respect to said body.

8. A sun roof assembly as defined in claim 7 wherein each of said locking members is resiliently biased into the releasing position thereof.

9. A sun roof assembly as defined in claim 8 wherein said pivoting members are in the form of generally triangular plates, one corner of which is pivoted to the associated mounting arm.

10. A sun roof assembly as defined in claim 9 wherein each of said spaced first and second sliding connections include spaced first and second pins fixed to and extending transversely from two other corners of each triangular plate.

11. A sun roof assembly as defined in claim 10 wherein each of said spaced first and second sliding connections include first and second pin receiving grooves formed in a side of each sliding member, said first and second grooves being spaced generally in the direction of extent of the associated track.

12. A sun roof assembly as defined in claim 11 wherein a shiftable element is carried by each forward slide member for cooperation with the associated track and associated sliding member, said shiftable elements being constructed and arranged (1) to couple the forward slide members with the tracks when in the forward closed or vented position thereof during the movement of the sliding members between the locked and vented positions thereof and (2) to couple the forward slide members to the sliding members for movement therewith during the movement of the sliding members between the vented and open positions thereof.

13. A sun roof assembly as defined in claim 1 wherein each of said locking members is resiliently biased into the releasing position thereof.

14. A sun roof assembly as defined in claim 13 wherein said pivoting members are in the form of generally triangular plates, one corner of which is pivoted to the associated mounting arm.

15. A sun roof assembly as defined in claim 14 wherein each of said spaced first and second sliding connections include spaced first and second pins fixed to and extending transversely from two other corners of each triangular plate.

16. A sun roof assembly as defined in claim 15 wherein each of said spaced first and second sliding connections include first and second pin receiving grooves formed in a side of each sliding member, said first and second grooves being spaced generally in the direction of extent of the associated track.

17. A sun roof assembly as defined in claim 1 wherein a shiftable element is carried by each forward slide member for cooperation with the associated track and associated sliding member, said shiftable elements being constructed and arranged (1) to couple the forward slide members with the tracks when in the forward closed or vented position thereof during the movement of the sliding members between the locked and vented positions thereof and (2) to couple the forward slide members to the sliding members for movement therewith during the movement of the sliding members between the vented and open positions thereof.

18. A sun roof assembly for an opening in a vehicle roof comprising a stationary frame assembly adapted to be mounted on the vehicle roof below the opening therein including an elongated fore and aft extending track on each side of said opening, a mounting arm associated with each track, a sun roof panel of a size to close the opening fixedly mounted on said mounting arms, a mounting mechanism associated with each track operatively connected with the associated mounting arm, each of said mounting mechanisms including a sliding member mounted in stable sliding relation on the associated track for rearward and forward movements with respect thereto between closed, vented and open positions, a locking member associated with each track mounted for movement between a locking position disposed in locking relation with a rearward portion of the associated mounting arm in the closed position thereof and a releasing position enabling the associated mounting arm to be moved out of the closed position thereof, a moving mechanism movable in opposite directions between locking and open positions, said forward slide members, said sliding members and said locking members being constructed and arranged with respect to said moving mechanism so that (1) said locking members are moved between the locking and releasing positions thereof when said moving mechanism is moved between said locking position and an intermediate releasing position, (2) said sliding members are moved between the closed and vented positions thereof when said moving mechanism is moved between an intermediate closed position and an intermediate vented position to pivot the mounting arms between the closed and vented positions thereof, and (3) the sliding members with the mounting arms in the vented position thereof are moved between the vented and open positions thereof when said moving mechanism is moved between said intermediate vented position thereof and the open position thereof, the improvement which comprises each of said locking members being elongated and slidably mounted in the associated track for fore and aft movement between said locking and releasing positions, each elongated locking member including a rearward locking portion movable within an opening in the associated track when said locking member is in the locking position thereof, each mounting arm having a laterally extending locking tab movable through the associated track opening when the mounting arm is moved from or into the closed position thereof, the locking portion of each locking member being constructed and arranged with respect to the associated track opening and locking tab to block the associated opening and interengage the associated locking tab in locking relation when the associated locking member is in the locking position thereof and to unblock the associated opening when the associated locking member is in the releasing position thereof.

19. A sun roof assembly improvement as defined in claim 18 wherein each of said locking members and the associated sliding member include one way abutting surfaces constructed and arranged to interengage during the forward movement of the associated sliding member when the associated locking member is in the releasing position thereof so as to move the associated locking member into the locking position thereof during the continued forward movement of the associated sliding member into the locking position thereof, each of said locking members also including a laterally shiftable moving element constructed and arranged with respect to the associated track and sliding member to be coupled with the associated sliding member during the rearward movement thereof from the locking position thereof until the associated locking member reaches the releasing position thereof and to be coupled to the associated track during the remaining rearward movement of the associated sliding member away from the locking position thereof.

20. A sun roof assembly improvement as defined in claim 18 wherein said each of said locking members is molded of a plastic material to include an elongated body with the shiftable moving element thereof being molded integrally with said body and integrally connected thereto by flexible elongated portions enabling said moving element to be shiftable laterally with respect to said body.

21. A sun roof assembly improvement as defined in claim 19 wherein each of said locking members is resiliently biased into the releasing position thereof.

22. A sun roof assembly for an opening in a vehicle roof comprising a stationary frame assembly adapted to be mounted on the vehicle roof below the opening therein including an elongated fore and aft extending track on each side of said opening, a mounting arm associated with each track, a sun roof panel of a size to close the opening fixedly mounted on said mounting arms, a forward slide member slidably mounted in each track for sliding movement between a forward closed or vented position and a rearward open position thereon, each of said mounting arms having a forward end thereof connected to the associated forward slide member for pivotal movement with respect thereto about a transverse horizontal axis between closed and vented positions when the associated forward slide member is in the forward position thereof and for movement with the associated forward slide member between the forward and rearward positions thereof when the associated mounting arm is in the vented position thereof with respect to the associated forward slide member so that the sun roof panel mounted on said mounting arms is disposed (1) in closing relation with said opening when said mounting arms are in the closed position thereof, (2) in inclined venting relation with the opening when said arms are in the vented position thereof and said forward slide members are in the forward position thereof, and (3) in an opening relation with respect to the opening when said mounting arms are in the vented position thereof and said forward slide members are in the rearward position thereof, first and second lift members associated with each track rearwardly of the forward slide member, each first lift member constituting a sliding member mounted in sliding relation on the associated track for rearward and forward movements with respect thereto between closed, vented and open positions, a connection between said each sliding member and associated second lift member, a locking member associated with each track said locking members being constructed and arranged to be moved between a locking position disposed in locking relation with a rearward portion of the associated mounting arm in the closed position thereof and a releasing position enabling the associated mounting arm to be moved out of the closed position thereof, a moving mechanism movable in opposite directions between locking and open positions, said forward slide members, said sliding members and said second lift members being constructed and arranged with respect to said moving mechanism so that (1) said locking members are moved between the locking and releasing positions thereof when said moving mechanism is moved between said locking position and an intermediate releasing position, (2) said sliding members are moved between the closed and vented positions thereof when said moving mechanism is moved between an intermediate closed position and an intermediate vented position to cause the second lift members to pivot the mounting arms between the closed and vented positions thereof, and (3) the sliding members and forward slide members with the mounting arms in the vented position thereof are moved together between the vented and open positions thereof when said moving mechanism is moved between the intermediate vented position thereof and the open position, a shiftable element carried by each forward slide member for cooperation with the associated track and associated sliding member, said shiftable elements being constructed and arranged (1) to couple the forward slide members with the tracks when in the forward closed or vented position thereof during the movement of the sliding members between the locked and vented positions thereof and (2) to couple the forward slide members to the sliding members for movement therewith during the movement of the sliding members between the vented and open positions thereof.

* * * * *